United States Patent
Heichelbech et al.

(10) Patent No.: US 9,856,772 B2
(45) Date of Patent: Jan. 2, 2018

(54) FLUID CONNECTORS FOR REDUCTANT SYSTEMS

(71) Applicant: Cummins Emission Solutions Inc., Columbus, IN (US)

(72) Inventors: John Heichelbech, Columbus, IN (US); James F. Burke, Columbus, IN (US); John Anthis, Columbus, IN (US); Andrew Myer, Greenwood, IN (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 73 days.

(21) Appl. No.: 15/131,315

(22) Filed: Apr. 18, 2016

(65) Prior Publication Data
US 2016/0230630 A1    Aug. 11, 2016

Related U.S. Application Data

(62) Division of application No. 13/851,445, filed on Mar. 27, 2013, now Pat. No. 9,341,295.

(51) Int. Cl.
| | |
|---|---|
| *F01N 3/02* | (2006.01) |
| *F01N 3/10* | (2006.01) |
| *F01N 3/20* | (2006.01) |
| *F16L 53/00* | (2006.01) |
| *F01N 3/28* | (2006.01) |

(52) U.S. Cl.
CPC .......... *F01N 3/208* (2013.01); *F01N 3/2896* (2013.01); *F16L 53/001* (2013.01); *F01N 3/2066* (2013.01); *F01N 2610/02* (2013.01); *F01N 2610/10* (2013.01); *F01N 2610/14* (2013.01); *F01N 2610/1486* (2013.01)

(58) Field of Classification Search
CPC ...... F01N 3/208; F01N 3/2896; F01N 3/2066; F01N 2610/02; F01N 2610/10; F01N 2610/14; F01N 2610/1486; F16L 53/001
USPC .................................................. 60/295, 299
See application file for complete search history.

(56) References Cited

U.S. PATENT DOCUMENTS

| | | |
|---|---|---|
| 5,943,858 A | 8/1999 | Hofmann et al. |
| 6,155,610 A | 12/2000 | Godeau et al. |
| 6,835,436 B1 | 12/2004 | Reif et al. |

(Continued)

FOREIGN PATENT DOCUMENTS

WO    WO 2013/028714 A1    2/2013

OTHER PUBLICATIONS

First Office Action issued for Chinese Patent Application No. 2014101099461, dated May 4, 2017, 7 pages.

*Primary Examiner* — Mark Laurenzi
*Assistant Examiner* — Dapinder Singh
(74) *Attorney, Agent, or Firm* — Foley & Lardner LLP

(57) ABSTRACT

A reductant system for an aftertreatment system of an internal combustion engine is disclosed. The reductant system includes at least one reductant feed line and a reductant system component such as a dosing module. The feed line is connected to the dosing module with a fluid connector. The fluid connector includes a body made from a first material that has a low heat conductivity and an insert made from a second material that has a greater heat conductivity than that of the first material. The insert extends from the body of the fluid connector into a storage chamber of the dosing module, and conducts heat from heated reductant in the feed line to the reductant stored in the storage chamber.

20 Claims, 3 Drawing Sheets

(56) References Cited

U.S. PATENT DOCUMENTS

| | | | |
|---|---|---|---|
| 6,880,862 B2 | 4/2005 | Mobley et al. | |
| 7,866,711 B2 | 1/2011 | Kerin et al. | |
| 8,087,239 B2 | 1/2012 | Bugos et al. | |
| 8,096,588 B2 | 1/2012 | Winzeler | |
| 8,556,300 B2 | 10/2013 | Isenburg et al. | |
| 8,740,113 B2 * | 6/2014 | Roessle | F01N 3/2066 239/585.1 |
| 8,910,884 B2 * | 12/2014 | Thomas | F01N 3/28 239/124 |
| 8,973,895 B2 * | 3/2015 | Thomas | F01N 3/2066 137/625.48 |
| 8,978,364 B2 * | 3/2015 | Olivier | F01N 3/2066 239/124 |
| 8,998,114 B2 * | 4/2015 | Olivier | F01N 3/2066 239/585.1 |
| 9,162,198 B2 * | 10/2015 | Martinelle | F01N 3/2066 |
| 9,638,081 B2 * | 5/2017 | Baasch | G05D 16/202 |
| 2004/0083723 A1 | 5/2004 | Hager et al. | |
| 2008/0011780 A1 | 1/2008 | Cooke | |
| 2008/0202108 A1 | 8/2008 | Stritzinger et al. | |
| 2009/0064666 A1 | 3/2009 | Behrendt et al. | |
| 2010/0313553 A1 | 12/2010 | Cavanagh et al. | |
| 2014/0230941 A1 | 8/2014 | De Beer et al. | |

* cited by examiner

FLUID CONNECTORS FOR REDUCTANT SYSTEMS

CROSS-REFERENCE TO RELATED APPLICATIONS

This application is a divisional of U.S. patent application Ser. No. 13/851,445, filed Mar. 27, 2013, the contents of which are hereby incorporated by reference in its entirety.

TECHNICAL FIELD

The present disclosure generally relates to reductant systems for internal combustion engines, and more particularly, but not exclusively, to fluid connectors for reductant systems that enhance connection of fluid lines with components of the reductant system.

BACKGROUND

Selective catalytic reduction ("SCR") exhaust after-treatment systems are an important technology for reducing NOx emissions from internal combustion engines such as diesel engines. SCR systems generally include a source of reductant such as a urea solution, a pump unit for pressurizing the urea solution, a metering unit for providing a controlled amount or rate of urea solution to an SCR catalyst, and an injector which provides urea solution to a urea decomposition region of an exhaust flow path located upstream from an SCR catalyst. Many SCR systems also utilize pressurized gas to assist the flow of urea solution to the injector.

While providing important reductions in NOx emissions, SCR systems suffer from a number of shortcomings and problems. The reductant in the storage tank may be actively heated, and the feed lines from the reductant storage tank to other components may also be heated, for example by electrical heating. However, areas where the feed lines are joined to the reductant system components, such as the inlet chamber of the injector or dosing module, may not receive sufficient heat to prevent freezing or to quickly unthaw frozen reductant after engine start in a cold ambient environment. Delay time for thawing of reductant during engine warm-up can have an emissions impact on the system. Therefore, additional improvements in this technology area are needed.

SUMMARY

One embodiment of the present disclosure is a unique fluid connector for a reductant system of an internal combustion engine exhaust after-treatment system. Other embodiments include apparatuses, systems, devices, hardware, methods, and combinations for reductant system components and fluid connectors provided therewith for connecting reductant lines to the reductant system components. Further embodiments, forms, features, aspects, benefits, and advantages of the present application shall become apparent from the description and figures provided herewith.

BRIEF DESCRIPTION OF THE FIGURES

FIG. I is a schematic depiction of an internal combustion engine with an embodiment of an exhaust after-treatment system of the present disclosure.

DETAILED DESCRIPTION OF THE ILLUSTRATIVE EMBODIMENTS

Figure 1:
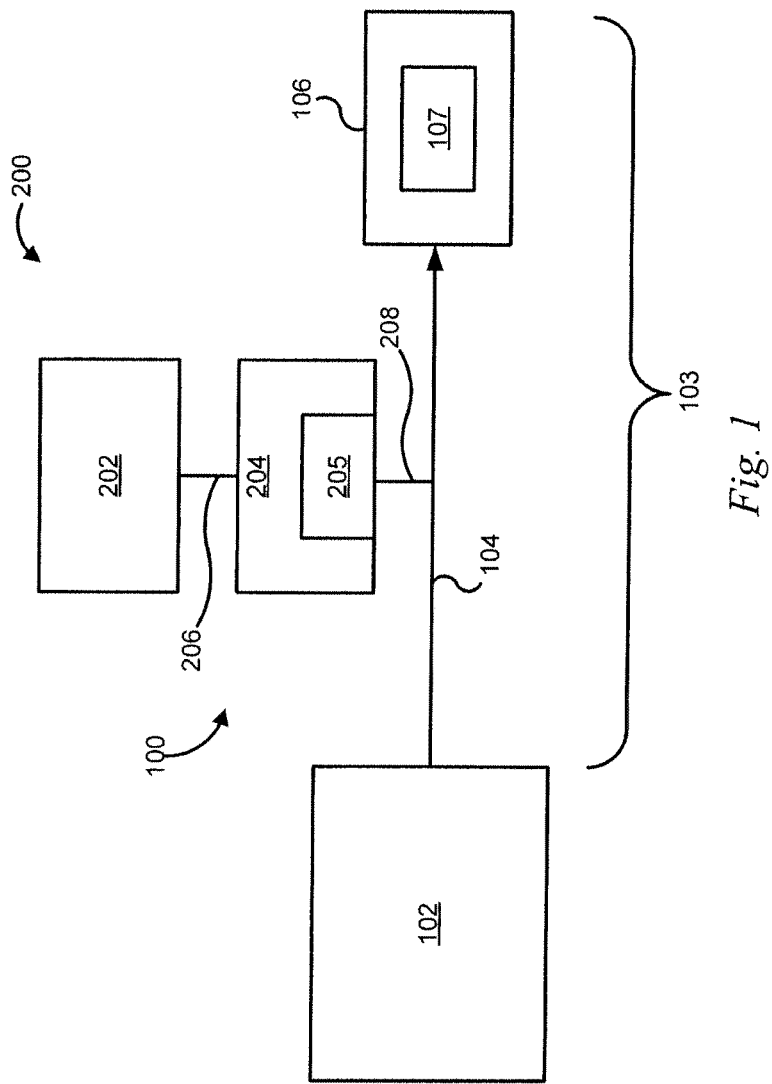

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, an example schematic of an internal combustion engine system 100 is shown that includes an internal combustion engine 102 connected to an exhaust system 103. The exhaust system 103 includes an exhaust stream or flow path 104 and an aftertreatment system 106 including, for example, a selective catalytic reduction (SCR) catalyst that is disposed in fluid communication with the exhaust stream 104. Engine system 100 also includes a reductant system 200 that is connected to exhaust system 103 and operable to provide a desired amount of reductant for treatment of pollutants in the exhaust gas with aftertreatment system 106. Reductant system 100 includes a reductant storage tank 202, a reductant dosing module 204, at least one feed line 206 connecting storage tank 202 to dosing module 204, and at least one injection line 208 connecting dosing module 204 to exhaust system 103 upstream of the aftertreatment system 106. The engine system 100 may be provided on a vehicle powered by the engine 102, and engine 102 may be a diesel engine or any other type of internal combustion engine that employs a reductant system 200 for treatment of exhaust gases. The engine system 100 may also be provided in other applications, such as, for example, power generation or pumping applications.

Figure 2:
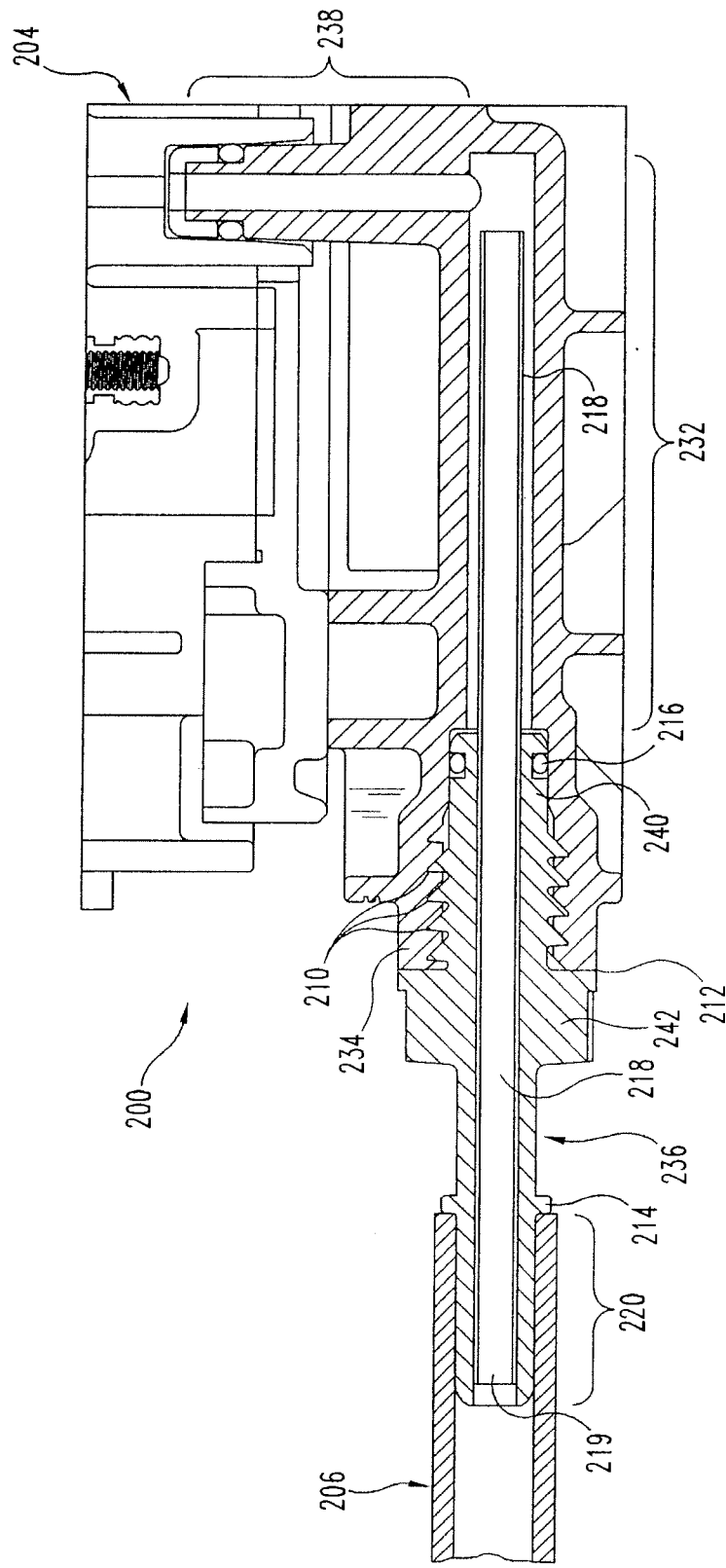
FIG. 2 is a side cross-sectional view of an embodiment of a fluid connector and reductant system component of the aftertreatment system of FIG. 1.

With reference to FIG. 2, a portion of reductant system 200 is shown including a partial side cross-sectional view of dosing module 204 and feed line 206. Dosing module 204 includes a chamber 232 downstream from an inlet 234. A fluid connector 236 is connected to dosing module 204 and feed line 206. In certain embodiments, the fluid connector 236 is an SAE J2044 compatible fluid connector, although any fluid connector or adapter is contemplated herein. The dosing module 204 is in fluid communication with and receives reductant from reductant storage tank 202 (FIG. 1). Dosing module 204 may include a pump (not shown) to draw the urea solution from the reductant tank 202 into chamber 232. Alternatively, reductant may be fed by gravity into chamber 232.

Dosing module 204 may also or alternatively include a metering valves (not shown), blending chamber 238, filters, check valves, flow paths, and other devices and arrangements that assist in providing a desired amount of reductant to exhaust stream 104 at appropriate timing to effectively treat pollutants in the exhaust gases. A metering valve (not shown) is operable to provide the reductant to a blending chamber 238 at a controllable rate. Blending chamber 238 may also receive a flow of pressurized air from an air supply (not shown) and discharge a combined flow of pressurized air and reductant to injection line 208. The air supply may be integral to a vehicle, integral to an engine, or may be an air supply dedicated to the engine system 100. It is appreciated that additional embodiments may utilize pressurized gases other than air, for example, combinations of one or more inert gases. Still other embodiments do not utilize air or blending of air with reductant.

An example reductant is a fluid such as a urea solution, ammonia, or diesel exhaust fluid. In one specific embodiment, the urea solution may be, for example, 32.5% high purity urea and 67.5% deionized water, although any concentration of a urea in solution may be utilized. In certain embodiments, the reductant tank 202 and the reductant therein is actively heated, by way of example and without limitation, through thermal contact with engine coolant and/or a dedicated electrical heater. In certain embodiments, the feed line 206 can also be actively heated by, for example, thermal contact with an electrical resistance heater.

During an engine stop in a cold ambient environment, the dosing module 204 is subjected to a cold soak, and stagnant reductant stored in the dosing module 204 may freeze. The stagnant reductant may be the reductant that remains at shutdown, or the remainder after a purge operation (e.g. with air from the air supply). While heating of reductant in storage tank 202 and/or feed line 206 may provide some heat transfer into chamber 232, the heat transfer is slow, and if the reductant is frozen the reductant can remain in that state for a significant time period after the engine system 100 is started. Furthermore, the initial flow of reductant into the chamber 232 after a cold soak of the entire reductant system 200 can also cause reductant that is already near freezing to freeze in the chamber 232 at initial startup.

Figure 3:
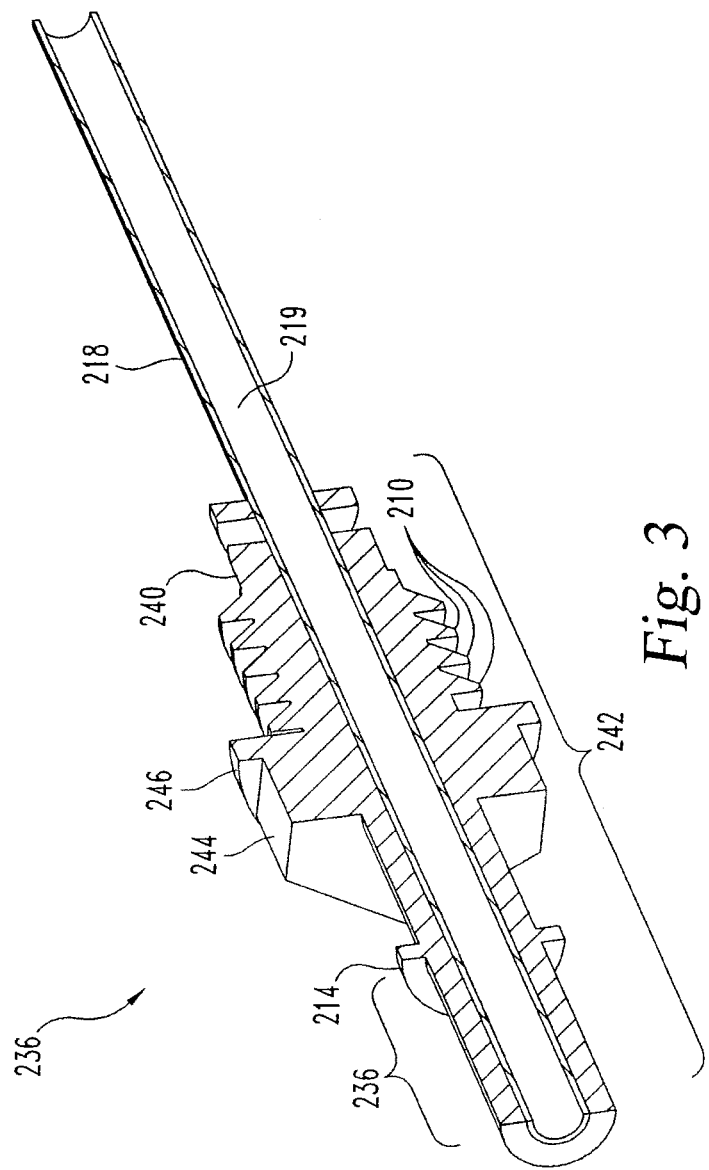
FIG. 3 is a perspective view of a cross-section of one embodiment of the fluid connector of FIG. 2.

With continued reference to FIGS. 1 and 2 and additionally to FIG. 3, the fluid connector 236 matingly mounts to inlet 234 of dosing module 204 and to the feed line 206 extending from reductant storage tank 202. The fluid connector 236 may, for example, include a body 242 with external threads 210 that fit in a correspondingly threaded opening 212 at inlet 234 to the chamber 232. Alternatively, the fluid connector 236 may attach to dosing module 204 via a friction fit, one or more clamps, one or more fasteners, adhesive, fusion, or other suitable attachment device, attachment devices, substance, technique and combinations thereof. The fluid connector 236 includes a first end 220 that may further be provided with a flange 214 to abut a fluid hose, tube or other structure forming the feed line 206. A clamp, fastener, adhesive, friction fit, or other suitable connection can secure the feed line to first end 220. One or more seals or gaskets 216 may be provided around body 242 or in a groove of body 242 at or near second end 240 of fluid connector 236 to sealingly engage the fluid connector 236 with dosing module 204 and prevent leakage of reductant from chamber 232.

The fluid connector 236 further includes an insert 218 that extends from first end 220 and through second end 240 to a location within chamber 232. In the illustrated embodiment, insert 218 extends along a majority of the length of chamber 232. In a specific embodiment, insert 218 is a metal tube and extends along substantially the entire length of chamber 232 and terminates just prior to the junction of blending chamber 238 with chamber 232. Reductant in chamber 232 surrounds insert 218, and insert 218 includes a passage 219 that extends between and opens at the opposite ends of insert 218 so that reductant flows through insert 218 into chamber 232.

The fluid connector 236 can include body 242 that extends between each of the first end 220 and the second end 240. Body 242 includes a central hub 244 with a flange 246 that abuts a facing end of inlet 234 when fluid connector 236 is engaged to dosing module 204. Body 242 is made from a first material such as plastic that is low cost and of low thermal conductivity. The plastic body 242 of fluid connector 236 reduces the cost of the fluid connector 236, and reduces the thermal conductivity between the fluid connector 236 and the ambient environment. Conversely, the insert 218 is preferably made of a material having a higher thermal conductivity than plastic, such as a metal. The insert 218 may be made of stainless steel; however other metals may be utilized. The insert 218 provides for improved thermal conductivity between the reductant in fluid line 206 which may include actively heated reductant and the interior portion of dosing module 204 including suction chamber 232. The outer plastic body 242 and the insert 218 may be mated together by any known means, such as, for example, overmolding the plastic exterior over the insert 218. Insert 218 also increases the bending strength of the fluid connector 236, and especially the bending strength of the extended portion at first end 220 along which the feed line 206 is connected. Insert 218 may extend in fluid connector 236 up to and adjacent the end-most tip at first end 220 to maximize heat conduction from the heat of reductant in feed line 206 to the reductant in chamber 232.

One aspect of the present application is a system including an internal combustion engine operable to produce an exhaust stream that passes through an exhaust aftertreatment system connected to the engine. The exhaust aftertreatment system is connected to a reductant system that includes a reductant dosing module with an inlet and at least one reductant feed line connected to the reductant dosing module at the inlet with a fluid connector. The reductant dosing module includes a chamber downstream of the inlet, and the fluid connector includes a body made from a first material. The body extends between and connects the reductant feed line to the inlet of the reductant dosing module. The fluid connecter further includes an insert made from a second material that provides greater heat conductivity capability than the first material. The insert extends outwardly from the body and into the chamber to provide heating of reductant in the chamber.

According to one embodiment, the reductant dosing module includes a pump downstream of the chamber. In one refinement, the reductant dosing module is connected to the exhaust stream upstream of a selective catalytic reduction catalyst of the exhaust aftertreatment system. In another embodiment the first material is plastic and the body of the fluid connector includes a first end connected to the fluid line and an opposite second end threadingly engaged to the inlet of the dosing module. In a refinement of this embodiment, the insert is a metal tube that projects outwardly from the second end into the chamber and the metal tube further extends through the body from the second end to the first end. In a further refinement, the metal tube is a stainless steel tube. In yet another embodiment, the insert defines a flow passage extending through the body of the fluid connector.

Another aspect of the present disclosure provides an apparatus that includes a reductant dosing module including a suction chamber in fluid communication with a reductant storage tank. The apparatus also includes a feed line extending from the reductant storage tank for providing reductant from the storage tank to the chamber. The apparatus further includes a fluid connector connecting the feed line to an inlet of the dosing module where the inlet is upstream of the suction chamber. A metal insert extends through the fluid connector and into the suction chamber. The insert is in contact with reductant in the fluid connector and in the suction chamber.

One embodiment of this aspect includes a tubular insert that defines a flow passage for the reductant through the fluid connector into the suction chamber. In one refinement, the fluid connector includes a plastic body with a first end connected to the feed line and a second end connected to the inlet. In a further refinement, the second end of the fluid connector includes external threads that are threadingly engaged to internal threads along the inlet of the dosing module.

Yet another aspect of the present disclosure provides an apparatus that includes a reductant dosing module with a chamber for receiving a reductant from a feed line. The feed line includes a fluid connector extending between a first end and an opposite second end, and the second end is mounted to the reductant dosing module. The fluid connector is comprised of a first material. The apparatus also includes an insert that extends along a passage of the fluid connector in contact with the reductant. The insert projects outwardly from the second end of the fluid connector into the chamber. The insert is comprised of a second material that conducts heat more efficiently than the first material.

In one embodiment of this aspect, the first end of the fluid connector is connected to the feed line. In one refinement, the insert is a metal tube. In a further refinement, the metal tube defines the passage through the fluid connector and the metal tube extends outwardly from the second end of the fluid connector to a terminal end of the metal tube that is located in the chamber so that the metal tube extends along substantially an entire length of the chamber and reductant is stored in the chamber around the metal tube. In yet a further refinement, the reductant dosing module includes a blending chamber downstream of the chamber and the terminal end of the metal tube.

Another aspect of the present disclosure is a method that includes operating a reductant dosing module including a chamber in fluid communication with a reductant feed line and reductant in the chamber and the feed line where the reductant feed line is connected to the dosing module with a fluid connector; heating reductant in the feed line; and conducting heat from the reductant in the feed line to reductant in the chamber via an insert that is in contact with the reductant in the feed line and the extends through the fluid connector into the chamber so that reductant in the chamber surrounds the insert.

In one embodiment of the method, the insert is made from metal and the fluid connector is made from plastic, and the insert is housed in the fluid connector. In another embodiment, the method includes flowing reductant through the insert from the feed line into the chamber. In yet another embodiment, the feed line connects the dosing module with a reductant tank and the dosing module is connected to an exhaust system with an injector.

While the invention has been illustrated and described in detail in the drawings and foregoing description, the same is to be considered as illustrative and not restrictive in character, it being understood that only certain embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The invention claimed is:

1. A method comprising:
    operating a reductant dosing module comprising a chamber in fluid communication with a reductant feed line, wherein a reductant is in said chamber and in said feed line, and further wherein said reductant feed line is connected to said reductant dosing module with a fluid connector;
    heating said reductant in said reductant feed line; and
    transferring heat from said reductant in said reductant feed line to said reductant in said chamber via an insert that is in contact with said reductant in said reductant feed line and extends through said fluid connector into said chamber so that said reductant in said chamber surrounds at least a portion of said insert.

2. The method of claim 1, wherein said insert is made from metal and said fluid connector is made from plastic, and said insert is housed in said fluid connector.

3. The method of claim 1, further comprising flowing reductant through said insert from said reductant feed line into said chamber.

4. The method of claim 1, wherein said reductant feed line connects said reductant dosing module with a reductant tank and said reductant dosing module is connected to an exhaust system with an injector.

5. The method of claim 2, wherein the insert is made from stainless steel.

6. The method of claim 1, further comprising:
    positioning the insert through the fluid connector; and
    fluidly coupling the reductant feed line to the reductant dosing module via the fluid connector such that the insert extends from the reductant feed line into the chamber of the reductant dosing module.

7. The method of claim 6, wherein the fluid connector comprises a body defining a body cross-section, a first end, a second end opposite the first end, a first flange defined on the first end, a central hub positioned downstream of the first flange and defining a central hub cross-section larger than the body cross-section, and a second flange continuous with the central hub, the second flange defining a second flange cross-section larger than each of a first flange cross-section of the first flange, the body cross-section, and the central hub-cross-section.

8. The method of claim 7, wherein fluidly coupling the reductant feed line to the reductant dosing module via the fluid connector comprises positioning the fluid connector such that the body of the fluid connector extends between and connects the reductant feed line to the inlet of the reductant dosing module, the first end is coupled to the feed line, the first flange abuts an end of the feed line, the second end is coupled to the inlet of the reductant dosing module, and the second flange abuts a facing end of the inlet of the reductant dosing module.

9. The method of claim 8, wherein the second end of the fluid connector is threadingly engaged to the inlet of the reductant dosing module.

10. The method of claim 7, wherein the insert extends in the fluid connector up to an end-most tip at the first end of the fluid connector.

11. The method of claim 1, wherein the insert extends along an entire length of the chamber.

12. The method of claim 1, further comprising:
fluidly coupling the reductant dosing module to an aftertreatment system.

13. The method of claim 12, wherein the aftertreatment system comprises a selective catalytic reduction system, and wherein the reductant dosing module is fluidly coupled to the aftertreatment system upstream of the selective catalytic reduction system.

14. A method of fluidly coupling a reductant storage tank to a reductant dosing module, comprising:
fluidly coupling a reductant feed line to the reductant storage tank;
fluidly coupling a fluid connector to the reductant feed line, the fluid connector comprising:
a body defining a body cross-section, the body comprising a first end and a second end opposite the first end, the first end fluidly coupled to the reductant feed line,
a first flange defined on the first end of the body, the first flange abutting an end of the reductant feed line,
a central hub positioned downstream of the first flange and defining a central hub cross-section larger than the body cross-section,
a second flange continuous with the central hub, the second flange defining a second flange cross-section larger than each of a first flange cross-section of the first flange, the body cross-section, and the central hub-cross-section, and
an insert positioned through the body of the fluid connector, the insert defining a passageway for a reductant to flow therethrough; and fluidly coupling the second end of the fluid connector to an inlet of the reductant dosing module such that the body of the fluid connector extends between and connects the reductant feed line to the inlet of the reductant dosing module, the second flange abuts a facing end of the inlet of the reductant dosing module, and the insert extends into a chamber of the reductant dosing module.

15. The method of claim 14, wherein the insert is made from metal and the body of the fluid connector is made from plastic.

16. The method of claim 15, wherein the insert is made from stainless steel.

17. The method of claim 14, wherein the second end of the fluid connector is threadingly engaged to the inlet of the reductant dosing module.

18. The method of claim 14, wherein the insert extends in the fluid connector up to an end-most tip at the first end of the fluid connector.

19. The method of claim 17, wherein the insert extends along an entire length of the chamber.

20. The method of claim 14, further comprising:
flowing a reductant through the reductant feed line to the chamber via the insert; and
heating the reductant feed line so as to heat the reductant, the heating causing the insert to communicate heat from the heated reductant in the reductant feed line to the reductant contained within the chamber.

* * * * *